United States Patent [19]

Lin

[11] Patent Number: 5,363,300

[45] Date of Patent: Nov. 8, 1994

[54] VEHICLE ACCELERATION SENSOR

[75] Inventor: William C. Lin, Troy, Mich.

[73] Assignee: General Motors Corporation, Detroit, Mich.

[21] Appl. No.: 11,593

[22] Filed: Feb. 1, 1993

[51] Int. Cl.$^5$ .................... G06F 15/50; B60K 31/00
[52] U.S. Cl. ..................... 364/424.01; 364/426.02; 364/551.01; 180/197; 375/99
[58] Field of Search ............ 364/424.01, 426.01, 364/431.07, 551.01, 551.02, 566, 572, 574; 303/97; 375/99, 103; 73/488, 503, 510, 511, 649; 180/197; 280/735

[56] References Cited

U.S. PATENT DOCUMENTS

| | | | |
|---|---|---|---|
| 4,105,258 | 8/1978 | Bornfleth | 303/93 |
| 4,758,959 | 7/1988 | Thoone et al. | 364/454 |
| 4,765,648 | 8/1988 | Mander et al. | 280/707 |
| 5,063,782 | 11/1991 | Kellett | 73/654 |
| 5,123,714 | 7/1992 | Mori | 303/103 |
| 5,146,417 | 7/1992 | Watson | 364/571.01 |
| 5,243,544 | 9/1993 | Schoess | 364/566 |
| 5,265,472 | 11/1993 | Pfeifle et al. | 364/426.01 |

Primary Examiner—Thomas G. Black
Assistant Examiner—Tan Q. Nguyen
Attorney, Agent, or Firm—Howard N. Conkey

[57] ABSTRACT

A vehicle accelerometer measures vehicle acceleration and provides acceleration data subject to contamination by noise signals. The acceleration data is filtered by a filter. A predetermined function of the noise level in the acceleration data is compared with the filter error which is the difference between raw acceleration data and the filtered value of acceleration. When the filter error is less than the noise level, the filter time constant is set to establish a low cutoff frequency so that the filter rejects the noise like a conventional low pass filter. When the filter error becomes greater than the predetermined function of the noise level, the filter time constant is set to establish a higher cutoff frequency so that the filtered value of acceleration converges to the ideal value faster than would occur with the filter having the lower cutoff frequency.

5 Claims, 2 Drawing Sheets

VEHICLE ACCELERATION SENSOR

This invention relates to a method and system for determining vehicle acceleration based upon vehicle acceleration data which may be contaminated with noise.

BACKGROUND OF THE INVENTION

Information of vehicle acceleration may be useful in various vehicle systems. For example, during antilock braking and acceleration slip control, information of vehicle acceleration can be used for identifying the road surface condition. However, the signal of vehicle acceleration, whether obtained from a chassis mount accelerometer or derived from vehicle speed measurement such as from a ground speed sensor or a nondriven wheel speed sensor during acceleration slip control is usually contaminated with noise. In order to remove the noise from the useful data, a low pass filter is usually used. However, using a conventional low pass filter also results in delay in the recognition of a sudden change in acceleration with a resulting delay in the control response to the vehicle acceleration change.

For example, vehicle acceleration may be used in estimating the road surface condition for traction and/or acceleration slip control. The delay associated with the conventional low pass filter will delay the system response to a transition in a road surface condition such as a shift between a low and a high road surface coefficient of friction. If the cutoff frequency of the low pass filter is increased, this time delay may be shortened, but poor data quality results at steady state conditions.

SUMMARY OF THE INVENTION

According to this invention, the cutoff frequency of a low pass filter receiving noise contaminated vehicle acceleration data is switched according to the filter error so as to improve the response of the measurement of vehicle acceleration to sudden changes in vehicle acceleration while effectively eliminating the noise from the acceleration data during steady state vehicle acceleration conditions.

In the preferred mode of this invention, the noise level in the acceleration data is compared with the filter error which is the difference between raw acceleration data and the filtered value of acceleration to determine the cutoff frequency of the low pass filter. At steady state conditions, the filter error is less than the noise level and a lower cutoff frequency is used for the filter such that the filter rejects the noise like a conventional low pass filter. At the time of a transition in vehicle acceleration as occurs, for example, at a surface transition of the road surface over which the vehicle is traveling, the resulting significant filter error is detected. When the filter error becomes greater than a predetermined function of the noise level, the cutoff frequency of the filter is switched to a higher value. As a result, the filtered value of acceleration converges to the ideal value much faster than would occur with the filter having the lower cutoff frequency. When the transition process is complete, the lower cutoff frequency is again established. This results in a rapid recognition of the new acceleration value representing, for example, the new road surface condition, without sacrificing the steady state data quality.

BRIEF DESCRIPTION OF THE DRAWINGS

The invention may be best understood by reference to the following description of a preferred embodiment and the drawings in which.

DESCRIPTION OF A PREFERRED EMBODIMENT

Figure 1:
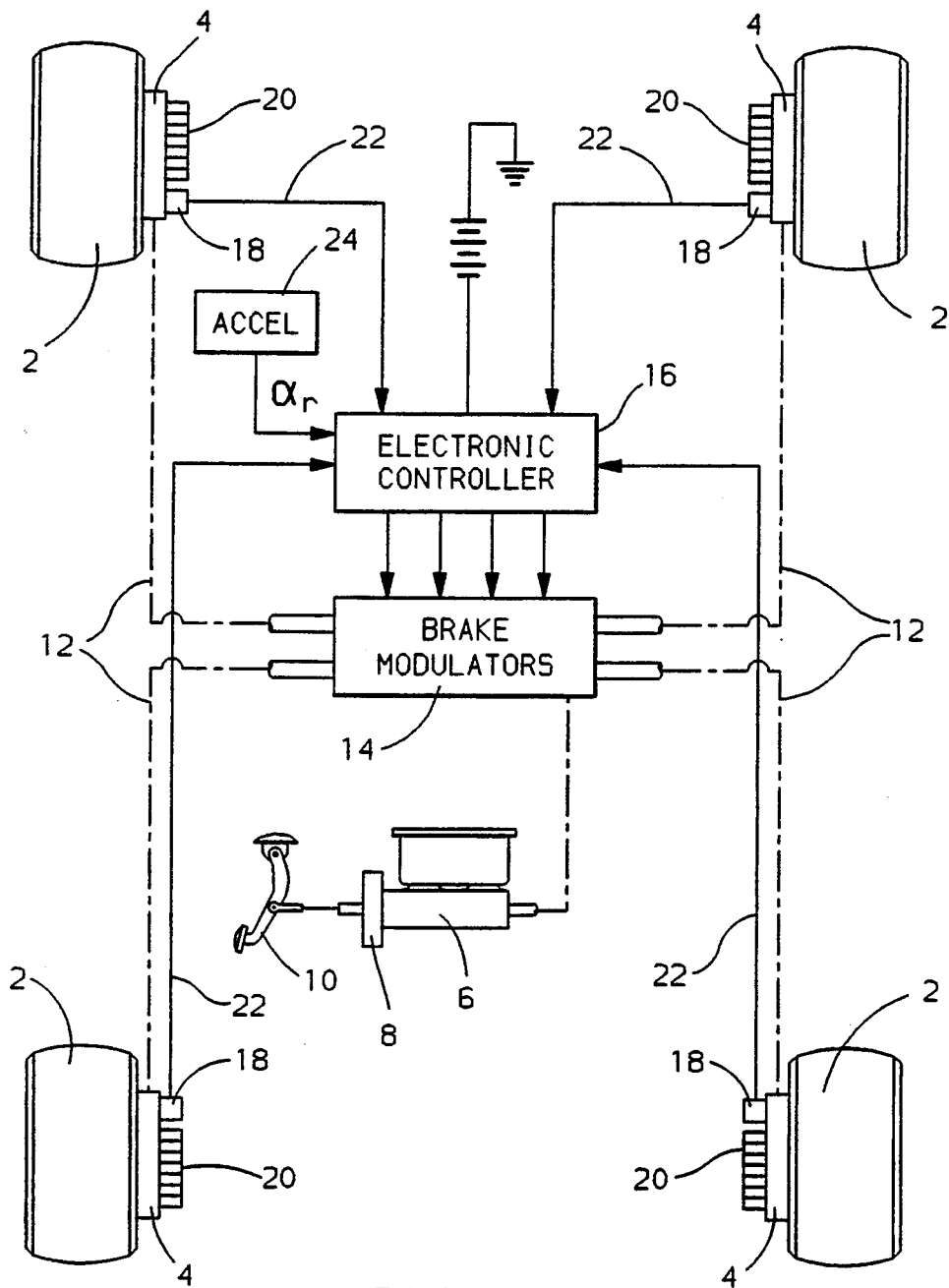
FIG. 1 is a schematic diagram of a vehicle antilock wheel braking system utilizing the present invention.

A vehicle brake system having an antilock control function is illustrated in FIG. 1. The vehicle includes wheels 2 each having a respective conventional hydraulic brake 4 actuated by hydraulic pressure provided by a master cylinder 6 and a hydraulic boost unit 8 operated by the vehicle operator through actuation of the foot pedal 10. The hydraulic fluid under pressure from the master cylinder 6 is provided to each of the wheel brakes 4 via a respective brake line 12 and a respective one of four individual brake modulators 14. When a brake modulator is inactive, the hydraulic fluid from the master cylinder 6 passes through such brake modulator to the respective wheel brake 4. Thus each of the brake modulators 14 are transparent to the brake system during normal braking of the wheels 2. Each of the four brake modulators 14 may take the form of the motor driven pressure modulator illustrated in the U.S. Patent Leppeck et al 5,106,171 which issued Apr. 21, 1992 and which is assigned to the assignee of this invention. The contents of this patent are hereby incorporated by reference.

If the hydraulic brake pressure applied to any one of the wheel brakes 4 is such that the slip of the related wheel exceeds a critical slip value, the wheel rapidly begins to lock up. In order to limit the slip and prevent a lockup condition, an electronic controller 16 provides for operation of the corresponding brake modulator 14 so as to limit the hydraulic pressure applied to the wheel brake 4 to establish a desired limit slip value. In order to control the brake modulators 14 to limit the slip of the wheels 2, the electronic controller 16 monitors the individual wheel speeds provided by a wheel speed sensor 18 on each wheel adjacent a toothed wheel 20 and connected to the electronic controller via conductors 22. In order to determine a slip limit value to which a wheel is controlled in response to a sensed incipient wheel lockup condition that is a function of the road surface condition, a vehicle chassis accelerometer 24 provides an acceleration signal $a_r$ to the electronic controller 16. The acceleration signal may be positive representing increasing vehicle speed or negative indicating decreasing vehicle speed (deceleration).

In general, when the electronic controller 16 senses a need for antilock controlled braking, the value of vehicle deceleration is representative of the coefficient of friction of the road surface upon which the vehicle is traveling. The electronic controller 16 utilizes the value of vehicle deceleration to establish a command slip value to which the wheel is regulated to prevent wheel lockup. In general, the command slip value is a predetermined value determined to produce the maximum braking force for the sensed road surface coefficient of friction. The electronic controller 16 then regulates the hydraulic pressure to the respective wheel brake via the respective brake modulator to control the wheel slip at the determined slip command value.

It can be seen that in this application, it is desirable that the controller respond quickly to changes in the road surface condition which in turn requires the system sense the resulting change in vehicle acceleration or deceleration with a minimum of delay. As will be described, this invention provides for the determination of vehicle acceleration based upon the acceleration signal $a_r$ from the chassis accelerometer 24 such that rapid changes in vehicle acceleration/deceleration resulting from changes in the road surface condition are rapidly sensed while at the same time providing a high quality indication of vehicle acceleration at steady state conditions even though the acceleration signal $a_r$ provided by the chassis accelerometer 24 is contaminated with noise.

The electronic controller 16 takes the form of a conventional general purpose digital computer based controller programmed to control the brake modulators in response to a sensed incipient wheel lockup condition so as to inhibit the wheel lockup condition. Accordingly, the controller 16 includes a common digital computer with associated read only and random access memory, a central processing unit and input/output sections which interface with the brake modulators 14, the individual wheel speed sensors 18, and the acceleration sensor 24. The computer may, in one embodiment, take the form of the Motorola single chip microcomputer MC68HC11.

Figure 2:
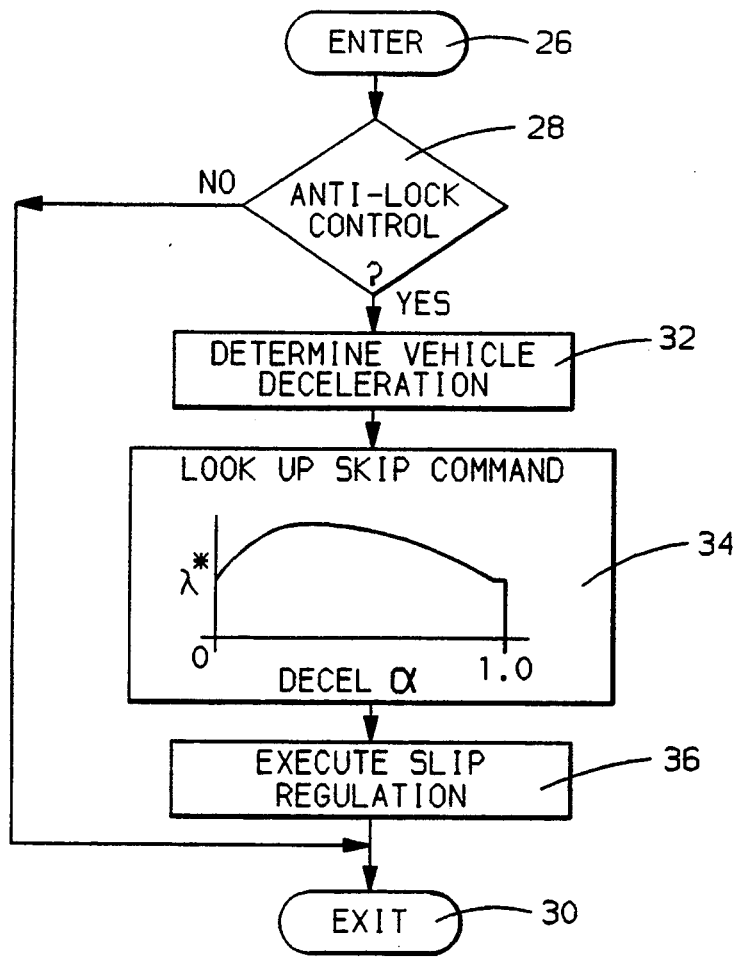
FIGS. 2 and 3 are flow diagrams illustrating the operation of the antilock braking system of FIG. 1 incorporating the principles of this invention for determining vehicle acceleration.
Figure 3:
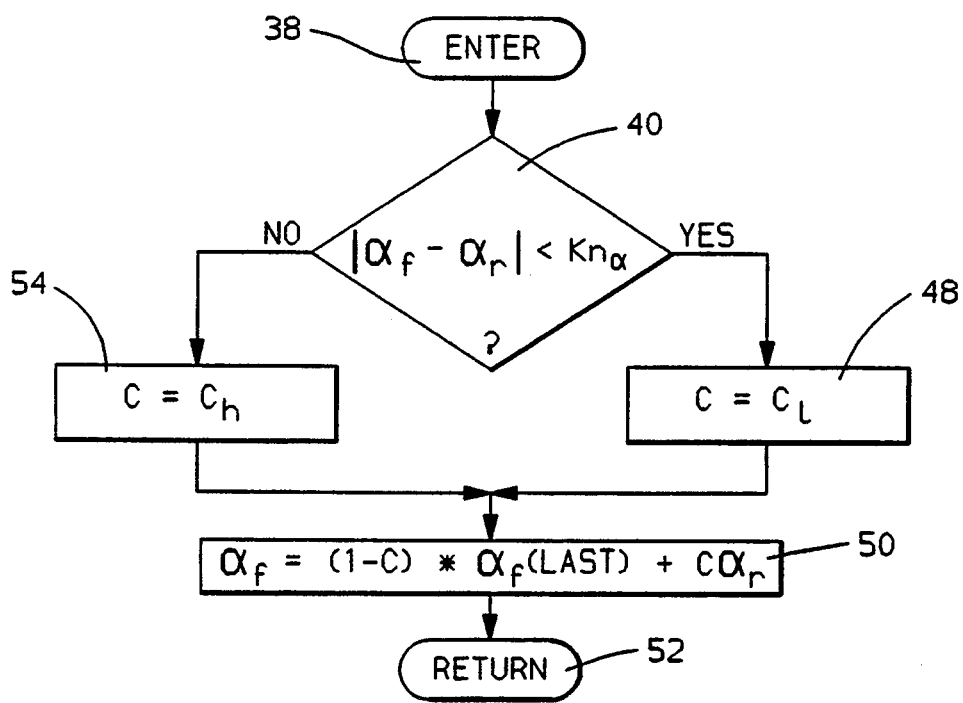

The read only memory of the digital computer of the controller 16 contains the instructions necessary to implement the control algorithm as diagrammed in FIGS. 2 and 3 which illustrate the routine executed for each of the vehicle wheels for antilock brake pressure control. The flow diagram function blocks of FIGS. 2 and 3 each describes the general task or process being executed by the electronic controller 16 at that point. A specific program for carrying out the functions depicted in the flow diagrams may be accomplished by standard skill in the art using conventional information processing languages.

The antilock brake control routine executed by the controller 16 in response to a real time interrupt generated at constant intervals such as 10 milliseconds is illustrated in FIG. 2. While illustrated and described in relation to a single one of the wheels 2 and the parameters associated therewith, it is understood that the routine is repeated for each of the wheels utilizing parameters associated with the corresponding wheel and providing for individual control of the brake modulator associated with the wheel. In response to each one of the real time interrupts, the program is entered at point 26 and proceeds to a step 28 which determines if the wheel parameters indicate an incipient wheel lockup condition indicating a requirement for antilock controlled regulation of the hydraulic pressure. The criteria for entering into antilock controlled regulation of the brake pressure may comprise any of the well known criteria for sensing an incipient lockup condition of the wheel. For example, excessive wheel deceleration represented by the wheel speed signal provided on line 22 of the respective wheel or excessive wheel slip computed from wheel speed and an estimated vehicle speed may form the basis for determining whether or not antilock controlled regulation of brake pressure is required. If a requirement for regulation of the brake pressure to prevent wheel lockup does not exist, the program exits the routine at step 30.

If, however, step 28 determines a need for regulating the brake pressure to prevent wheel lockup, the routine provides for controlling the hydraulic pressure to the wheel brake so as to establish the slip of the wheel in relation to the road surface at a value that is a function of the road surface coefficient of friction. In general, the vehicle deceleration is used as a measure of the coefficient of friction of read surface. Low values of vehicle deceleration during antilock controlled braking indicates a low coefficient of friction surface whereas a high value of vehicle deceleration represents a high coefficient of friction surface.

Vehicle deceleration representing a measure of the road surface coefficient of friction is determined at step 32 in accord with this invention as further detailed in FIG. 3 to be described. At the next step 34, the routine determines a slip command value $\lambda^*$ that is a function of the road surface condition represented by vehicle deceleration computed at step 32. This slip command is obtained from a lookup table of values stored in memory having stored values of slip command as a function of vehicle deceleration. The slip command value $\lambda^*$ stored in the lookup table represent a predetermined curve of the optimum slip producing the maximum braking effort as a function of the road surface condition. It is readily apparent that it is desirable to be able to sense a change in the road surface condition substantially instantaneous in order to establish the wheel slip at the optimum value for the new road surface condition. From step 34, the routine executes a slip regulation routine at step 36 wherein the brake modulator 14 corresponding to the wheel for which the routine is being executed is controlled by the electronic controller 16 in a manner to establish the wheel slip at the slip command value retrieved from the lookup table at step 34. In general, the routine 36 may take any conventional form of closed loop regulation of wheel slip. In one form, the routine 34 may provide integral, proportional, and derivative control terms in response to a sensed error in computed wheel slip relative to the command value. In the embodiment wherein the brake modulators 14 each take the form of a motor driven piston as illustrated in the U.S. Pat. No. 5,106,171, the current to the motor controlling the pressure is regulated in accord with the proportional, derivative, and integral control terms to establish the brake pressure at the value resulting in the slip being established at the command value. One example of a control algorithm embodied in step 36 for regulating brake pressure to establish the desired wheel slip is described in the publication Research Disclosure, publication number 29549, November 1988. From step 36, the routine exits at step 30 after which the routine is again repeated in response to the next real time interrupt to provide for continuous control of wheel slip.

The raw acceleration signal $a_r$ provided by the accelerometer 24 may typically be contaminated with noise. In order to remove the noise from the useful vehicle acceleration data, a low pass filter is usually used. While this filter allows the acceleration data to be separated from noise at steady state conditions, it also results in delay in the determination of the surface condition represented by vehicle deceleration when there is a sudden shift in the surface condition. If the cutoff frequency of the low pass filter is increased, the delay in response to the shift in the surface condition can be shortened but poor data quality in the steady state vehicle acceleration data results. The routine executed at step 32 of FIG. 2 provides for a determination of vehicle deceleration in response to the raw acceleration signal $a_r$ in a manner that provides for high quality acceleration data during steady state deceleration conditions while at the same time responding rapidly to sudden changes in vehicle deceleration resulting from shifts in the road surface coefficient of friction. In general, the routine of step 32 controls the time constant of a digital filter providing an indication of vehicle deceleration based upon the relationship of the filter error and the noise level in the raw acceleration data $a_r$.

Referring now to FIG. 3, the routine of step 32 is entered at point 38 and proceeds to a step 40 where the filter error, represented by the absolute magnitude of the difference of the last filtered value of vehicle deceleration $a_f$ and the raw vehicle deceleration value $a_r$, is compared with the noise signal level $n_\alpha$ multiplied by an adjusting factor k having a value equal to or greater than unity.

Figure 4:
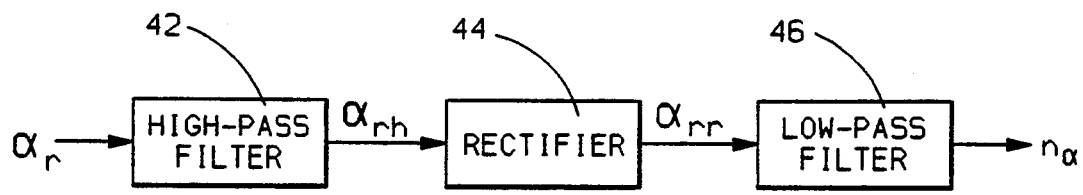
FIG. 4 is a block diagram of a circuit for determining the noise level from raw vehicle acceleration data.

In order to determine the noise signal level present in the raw acceleration data $a_r$, the electronic controller includes the circuit depicted by the block diagram of FIG. 4. Referring to FIG. 4, the raw acceleration data $a_r$ is provided to a high pass filter 42 which, in one embodiment has a cutoff frequency of 50 Hz. This filter extracts the noise components from the raw acceleration signal $a_r$ and provides the signal having a zero mean. This noise component $a_{rh}$ is then rectified by a rectifier 44 providing a signal $a_{rr}$ which in turn is input to a low pass filter 46 that generates the measure $n_\alpha$ of the noise level. In one embodiment, the filter 46 has a cutoff frequency of 0.2 Hz.

Returning to FIG. 3, when the filter error represented by the absolute magnitude of the difference between the filtered acceleration value $a_f$ and the raw data value $a_r$ is less than the adjusted noise level $kn_\alpha$, a substantially steady state vehicle acceleration condition exists and the program proceeds to a step 48 where a digital filter constant C is set to $C_1$ establishing a low cutoff frequency. While any desired low cutoff frequency may be selected depending upon the application and system condition, in one embodiment, the low cutoff frequency was established at 0.5 Hz. Thereafter the filtered value of deceleration $a_f$ is computed at step 50 in accord with the expression $a_f = (1-C)*a_f(\text{LAST}) + Ca_r$, where $a_f(\text{LAST})$ is the last computed value of $a_f$. This expression defines a recursive digital filter having a cutoff frequency dictated by the time constant C. Thereafter, the routine returns to the routine of FIG. 3 at step 52.

As long as the steady state vehicle deceleration condition exists as determined by step 40, the filtered value of vehicle acceleration substantially removes the noise content of the raw acceleration signal $a_r$ and provides a high quality indication of vehicle deceleration from which the slip command is determined at step 34. However, if the filter error becomes greater than the adjusted noise level $kn_{60}$ indicating a transient condition in vehicle deceleration resulting from a shift in the road surface condition, the routine proceeds to a step 54 where the filter time constant C is set to a value $C_h$ which is larger than the value $C_1$ (such as a value establishing a cutoff frequency of 50 Hz) resulting in an increase in the cutoff frequency of the recursive digital filter represented by the expression of step 50. Accordingly, the filtered value of acceleration $a_f$ computed at step 50 converges to the actual value substantially more rapidly than would occur with the filter using the time constant $C_1$. This results in the routine of FIG. 2 rapidly recognizing the change in the road surface condition represented by vehicle deceleration so that the slip value retrieved from the lookup table of step 34 more accurately corresponds to the actual road surface condition for more optimum control of the wheel pressure for antilock brake control.

In summary, the foregoing invention provides for a measure of vehicle acceleration that effectively removes the noise from the raw vehicle acceleration signal and further provides for rapid response to a rapid change in the vehicle acceleration.

The foregoing description of a preferred embodiment for the purpose of describing the invention is not to be considered as limiting the invention since many modifications may be made by the exercise of skill in the art without departing from the scope of the invention.

I claim:

1. A method of determining the acceleration of a vehicle from an acceleration signal $a_r$ generated by an accelerometer carried by the vehicle, the acceleration signal being contaminated by a noise signal, the method comprising the steps of:

determining a magnitude $n_\alpha$ of the noise signal;

filtering the acceleration signal $a_r$ by a filter having a time constant C to generate a filtered acceleration signal $a_f$ having a magnitude that comprises the determination of the vehicle acceleration;

comparing the magnitude of a difference between the acceleration signal $a_r$ and the filtered acceleration signal $a_f$ with a magnitude of a predetermined function of the noise signal;

setting the value of the time constant C equal to a value $C_1$ when the magnitude of the difference between the acceleration signal $a_r$ and the filtered acceleration signal $a_f$ is less than the magnitude of the predetermined function of the noise signal, the value $C_1$ establishing a predetermined low cutoff frequency of the filter to remove the noise signal from the acceleration signal $a_r$; and setting the value of the time constant C equal to a value $C_h$ when the magnitude of the difference between the acceleration signal $a_r$ and the filtered acceleration signal $a_f$ is greater than the magnitude of the predetermined function of the noise signal, the value $C_h$ establishing a predetermined cutoff frequency of the filter higher than the predetermined low cutoff frequency so that the determination of vehicle acceleration represented by the filtered acceleration signal $a_f$ more rapidly responds to rapid changes int he actual vehicle acceleration.

2. The method of claim 1 wherein the predetermined function of the magnitude $n_\alpha$ of the noise signal is defined by the expression $kn_{60}$, where $k \geq 1$.

3. The method of claim 1 wherein the steps of filtering the acceleration signal $a_r$, comparing the magnitude of the difference between the acceleration signal $a_r$ and the filtered acceleration signal $a_f$ with a predetermined function of the magnitude $n_{60}$ of the noise signal, and the steps of setting the value of the time constant are performed by a programmed digital computer.

4. The method of claim 3 wherein the filter is comprised of a recursive digital filter routine repeatedly executed by the programmed digital computer defined by the expression $a_f = (1-C)*a_f(\text{LAST}) + ca_r$, where $a_f(\text{LAST})$ is the last determined value of $a_f$.

5. A system for determining the acceleration of a vehicle, the system comprising:

an accelerometer responsive to vehicle acceleration for generating an acceleration signal $a_r$, the acceleration signal being subject to contamination by a noise signal;

means for determining a magnitude $n_{60}$ of the noise signal;

a signal filter for filtering the acceleration signal $a_r$ to generate a filtered acceleration signal $a_f$ by repeatedly determining the value of $a_f$ in accord with the expression $$a_f = (1-C) \cdot a_f(\text{LAST}) + C a_r,$$

where c is a filter time constant and $a_f(\text{LAST})$ is the last determined value of $a_f$, the magnitude of $a_f$ comprising a determination of the vehicle acceleration;

means for comparing the magnitude of a difference between the acceleration signal $a_r$ and the filtered acceleration signal $a_f$ with a magnitude of a predetermined function of the noise signal;

means for setting the value of the time constant C equal to a value $C_l$ when the magnitude of the difference between the acceleration signal $a_r$ and the filtered acceleration signal $a_f$ is less than the magnitude of the predetermined function of the noise signal, the value $C_l$ establishing a predetermined low cutoff frequency of the signal filter to remove the noise signal from the acceleration signal $a_r$; and means for setting the value of the time constant C equal to a value $C_h$ when the magnitude of the difference between the acceleration signal $a_r$ and the filtered acceleration signal $a_f$ is greater than the magnitude of the predetermined function of the noise signal, the value $C_h$ establishing a predetermined cutoff frequency of the signal filter higher than the predetermined low cutoff frequency so that the determination of vehicle acceleration represented by the filtered acceleration signal $a_f$ more rapidly responds to rapid changes in the actual vehicle acceleration.

* * * * *